(12) United States Patent
Lessard

(10) Patent No.: US 8,931,722 B2
(45) Date of Patent: Jan. 13, 2015

(54) GRINDER PROVIDED WITH A DRIVE DEVICE FOR A CROWN GEAR

(75) Inventor: Fabrice Lessard, Cambrai (FR)

(73) Assignee: Compagnie Engrenages et Reducteurs—Messian—Durand, Cambrai (FR)

( * ) Notice: Subject to any disclaimer, the term of this patent is extended or adjusted under 35 U.S.C. 154(b) by 269 days.

(21) Appl. No.: 13/520,327

(22) PCT Filed: Jan. 6, 2011

(86) PCT No.: PCT/FR2011/050015
§ 371 (c)(1),
(2), (4) Date: Jul. 20, 2012

(87) PCT Pub. No.: WO2011/083274
PCT Pub. Date: Jul. 14, 2011

(65) Prior Publication Data
US 2013/0008273 A1 Jan. 10, 2013

(30) Foreign Application Priority Data

Jan. 6, 2010 (FR) ..................... 10 50053

(51) Int. Cl.
*B02C 17/24* (2006.01)
*F16H 1/22* (2006.01)
(52) U.S. Cl.
CPC . *B02C 17/24* (2013.01); *F16H 1/22* (2013.01)
USPC .......... 241/101.2; 241/178; 241/299
(58) Field of Classification Search
USPC .......... 241/101.2, 176, 177, 178, 299
See application file for complete search history.

(56) References Cited

U.S. PATENT DOCUMENTS

| | | |
|---|---|---|
| 2,441,901 A | 5/1948 | Petersen |
| 2,823,558 A | 2/1958 | Semar et al. |
| 2005/0011307 A1 | 1/2005 | Gmirya |

FOREIGN PATENT DOCUMENTS

| | | |
|---|---|---|
| DE | 76 27 915 U1 | 12/1976 |
| GB | 2288651 A | 10/1995 |
| JP | H04-187828 A | 7/1992 |
| JP | 2001327121 | 11/2001 |
| WO | WO 97/22817 | 6/1997 |
| WO | 03/090932 A1 | 11/2003 |
| WO | WO 2007/114817 A1 | 10/2007 |
| WO | WO 2008/060274 A2 | 5/2008 |

OTHER PUBLICATIONS

An International Search Report, mailed May 10, 2011, which issued during the prosecution of PCT/FR2011/050015 which corresponds to the present application.
Office Action, mailed Apr. 23, 2014, which issued during the prosecution of Japanese Patent Application No. 2012-547530, which corresponds to the present application.

*Primary Examiner* — Mark Rosenbaum
(74) *Attorney, Agent, or Firm* — McDermott Will & Emery LLP

(57) ABSTRACT

This grinder is provided with a drive device for a crown gear which comprises a reduction transmission which is provided:
with a drive shaft adapted so as to be connected to a motor,
with at least one output pinion, said or each output pinion being adapted so as to mesh with the crown gear and to be driven by the drive shaft, and
with a casing.
The reduction transmission comprises at least two output pinions.
Application to devices for driving horizontal grinders.

16 Claims, 10 Drawing Sheets

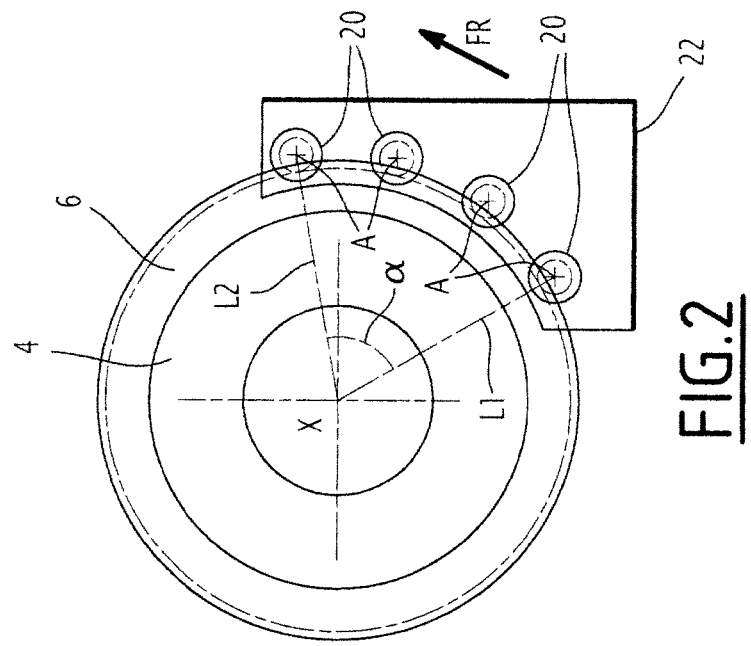
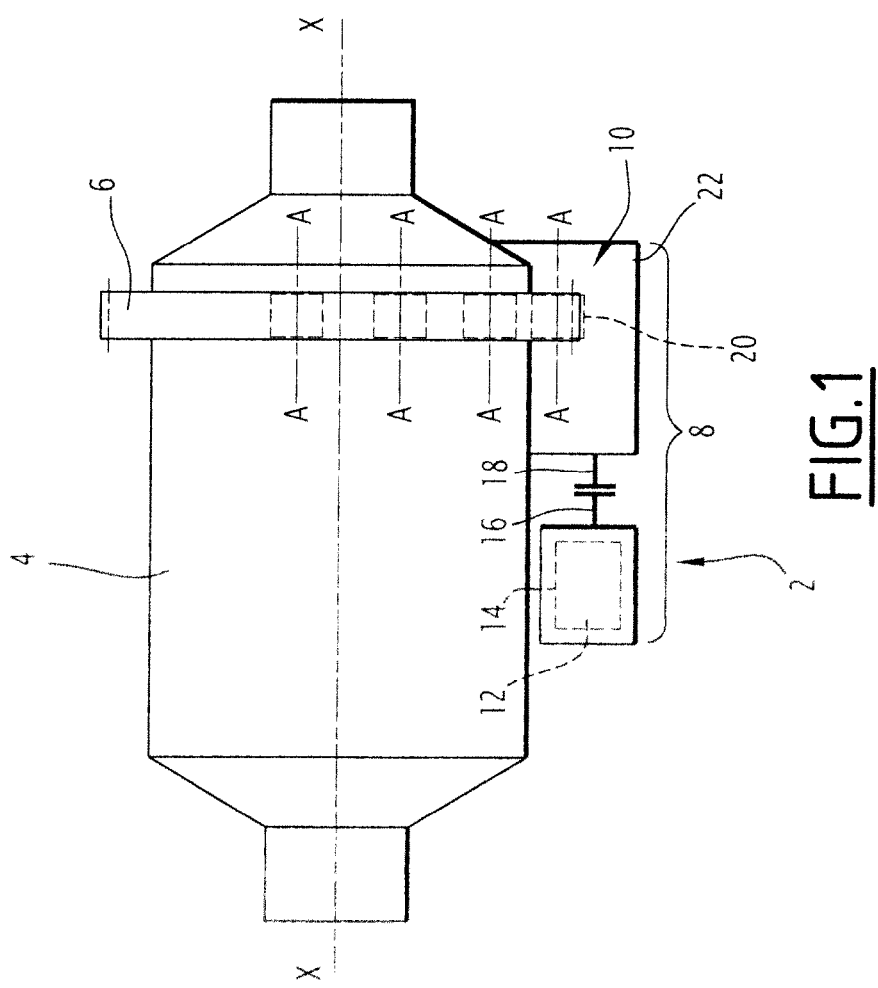

GRINDER PROVIDED WITH A DRIVE DEVICE FOR A CROWN GEAR

CROSS REFERENCE TO RELATED APPLICATIONS

This application is a U.S. National Phase application under 35 U.S.C. §371 of International Application No. PCT/FR2011/050015, filed on Jan. 6, 2011 which claims priority to FR 10 50053, filed Jan. 6, 2010. All of these applications are herein incorporated by reference.

The present invention relates to a grinder of the type indicated in the preamble of claim 1.

Horizontal grinders are known in the state of the art. These grinders comprise a grinding chamber on which is attached a crown gear. The crown gear is driven by a reduction transmission which is connected to a motor. The reduction transmission includes an output pinion which meshes with the crown gear.

The drive device of the state of the art has the following drawbacks:
 The power which may be transmitted by the reduction transmission is limited by the capacity of the teeth of the crown gear; and
 The reduction transmission is difficult to assemble and to disassemble, and it often requires disassembling and displacement of the casing with view to a change of the output pinion.

The object of the invention is to overcome at least one of these drawbacks.

For this purpose, the object of the invention is a grinder of the type indicated above, characterized by the characteristics of claim 1.

According to particular embodiments, the invention includes one or several of the following characteristics:
 The output pinions are arranged on a pitch circle, and the axes of rotation of all the output pinions are positioned inside an angular range of less than 180°, and notably less than 90°, of this pitch circle.
 The device comprises a drive motor, notably a single drive motor, the drive motor comprising a motor shaft and the motor shaft being secured in rotation to the drive shaft.
 The reduction transmission forms at least one group of pinions consisting every time of two output pinions, notably two adjacent output pinions and in which the reduction transmission comprises at least one downstream reduction stage and each group of pinions is driven by a downstream reduction stage.
 At least one or said downstream reduction stage comprises:
   a downstream toothed wheel per output pinion of the group of pinions, and
   a downstream pinion, notably a single downstream pinion, meshing with each axial toothed wheel of this downstream reduction stage.
 The downstream pinion is mounted with radial mobility relatively to the axes of rotation of the downstream toothed wheels.
 The casing delimits a pinion space, which accommodates at least one output pinion and a downstream space which accommodates at least one downstream reduction stage, in which the reduction transmission comprises sealing means separating the pinion space and at least the downstream space.
 The reduction transmission comprises at least one upstream reduction stage driven by the drive shaft, the upstream reduction stage being if necessary adapted so as to drive a downstream reduction stage.
 Said or each upstream reduction stage comprises:
   an upstream toothed wheel, for each group of pinions, and
   an upstream pinion, notably a single upstream pinion, adapted so as to drive each upstream toothed wheel and being secured in rotation relatively to the drive shaft.
 Said or each upstream reduction stage comprises if necessary for each group of pinions, an intermediate toothed wheel, each intermediate toothed wheel meshing with an upstream toothed wheel and the upstream pinion.
 The upstream reduction stage and the downstream reduction stage are connected through an elongated shaft, and the downstream pinion is mounted through a link with two ball joint centers at the upstream reduction stage.
 The reduction transmission comprises an output pinion module, this output pinion module comprising,
   an output pinion,
   an output shaft bearing the output pinion and optionally a downstream toothed wheel,
   two roller bearings supporting the output shaft,
   and the output pinion module is withdrawable as a single block from the casing and/or insertable in a single block into the casing.
 The reduction transmission comprises an upstream wheel comprising:
   one or said upstream toothed wheel,
   one upstream shaft bearing the upstream toothed wheel.
   two roller bearings supporting the upstream shaft,
   and wherein the upstream wheel module is withdrawable as a single block from the casing and/or insertable as a single block into the casing.
 Every time, the direction for inserting the output pinion module into the casing and the direction of insertion of the upstream wheel module and the direction of withdrawal of the output pinion module of the casing and the direction for removing the upstream wheel module from the casing are directed opposite to each other.
 A drive device in which the reduction transmission comprises at least one drive module comprising:
   the drive shaft,
   the upstream pinion,
   and the drive module may be withdrawn as a single block from the casing and/or inserted as a single block into the casing.
 The reduction transmission comprises an intermediate module comprising an intermediate toothed wheel and the intermediate module may be withdrawn from the casing along a withdrawal direction perpendicular to the axis of rotation C-C of the intermediate wheel, and in particular the intermediate module may be withdrawn from the casing through an aperture suitable for accommodating the upstream wheel module.
 Each output pinion is adapted so as to apply a meshing force to the crown gear 6 and in which the resulting force FR of all these meshing forces has a component directed vertically upwards.

The object of the invention is a grinder, notably a horizontal grinder, comprising a grinding chamber, a crown gear attached to the grinding chamber and a device for driving the crown gear, characterized in that the drive device is a drive device as described above.

The invention will be better understood upon reading the following description only given as an example and made with reference to the appended drawings, wherein:

FIG. 1 is a schematic side view of a horizontal grinder according to the invention;

FIG. 2 is an axial view of the grinder of FIG. 1;

Figure 3:
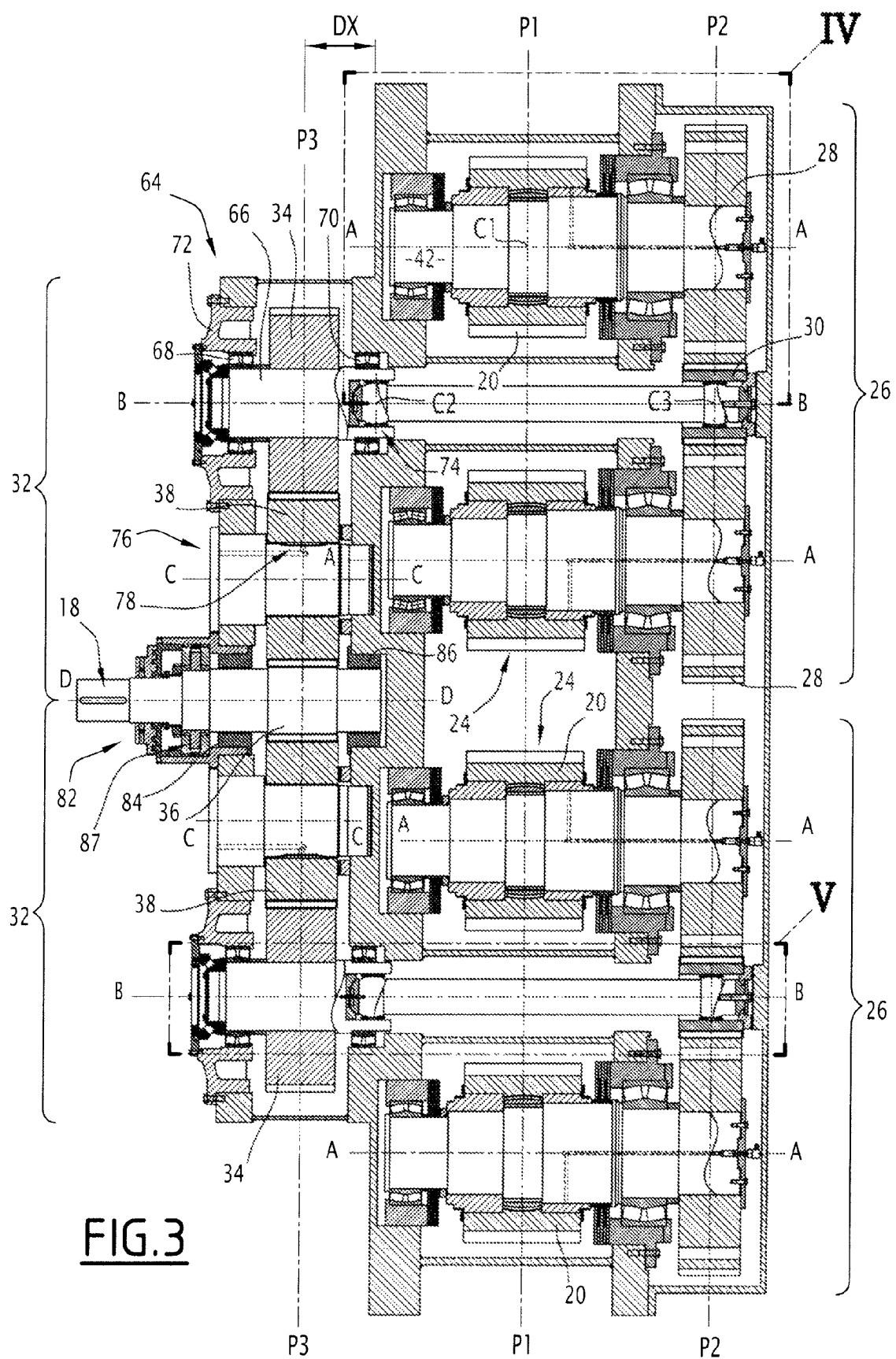
FIG. 3 is a sectional view of the reduction transmission of the grinder of FIGS. 1 and 2.

A horizontal grinder, designated by the general reference 2, is shown in FIG. 1.

The horizontal grinder 2 comprises a grinding chamber 4, a crown gear 6 attached to the grinding chamber 4 and a drive device 8 suitable for driving the crown gear 6.

The grinding chamber 4 is accommodated in rotation around an axis of rotation X-X, which is positioned horizontally.

The drive device 8 is provided with a reduction transmission 10 and with a single drive motor 12.

The drive motor 12 includes a rotor 14 which is attached to a motor shaft 16.

The reduction transmission 10 includes a drive shaft 18 which is suitable for being attached to the motor shaft 16. The drive shaft 18 and the motor shaft 16 are connected through a coupling.

The reduction transmission 10 is further provided with four output pinions 20, each of which is suitable for meshing with the crown gear 6 and adapted so as to be driven by the drive shaft 18. The reduction transmission 10 has a casing 22. In a general way, the reduction transmission 10 comprises at least two output pinions. It may include three output pinions or as in the present case, exactly four output pinions 20.

The output pinions 20 have straight teeth. The crown gear 6 also has straight teeth.

The output pinions 20 each define an axis of rotation A-A. These axes of rotation A-A are found on a pitch circle, the center of which coincides with the axis X-X. The axes of rotation A-A of all the output pinions 20 are positioned on an angular range α which is less than 180°, and notably less than 90°, of this pitch circle. This facilitates the assembly of the reduction transmission at the crown gear and leads to low congestion of the horizontal grinder.

During operation, each output pinion 20 applies a meshing force to the toothed wheel 6. All the output pinions 20 are positioned relatively to the crown gear 6 so that the resulting force FR of the meshing forces has a component directed vertically downwards. Thus the resulting force FR acts against the weight of the crown 6 and of the grinding chamber 4. Accordingly, the bearings borne by the grinding chamber and the crown gear may have relatively small dimensions.

For this purpose, the axes of rotation of all the output pinions 20 are advantageously positioned inside an angular range which is limited by a first limit L1 and a second limit L2.

The first limit L1 is tilted by 30° relatively to a half-plane extending vertically downwards from the axis X-X and shifted from this half-plane in the direction for driving the crown 6. The second limit L2 is tilted by 100° relatively to the aforementioned half-plane and shifted from this half-plane in the direction for driving the crown gear 6. In FIG. 2, the driving direction of the crown 6 is the anticlockwise direction.

Subsequently, the structure of the reduction transmission 10 will be described with reference to FIG. 3.

The reduction transmission 10 forms groups of pinions 24, each group of pinions 24 consisting of two adjacent output pinions 20. The reduction transmission 10 comprises for each group of pinions 24 an adapted downstream reduction stage 26 so as to drive this group of pinions 24. For this purpose, each downstream reduction stage 26 includes two downstream toothed wheels 28. The downstream reduction stage 26 also comprises a single downstream pinion 30 meshing with each downstream toothed wheel 28 of the downstream reduction stage 26.

Figure 13:
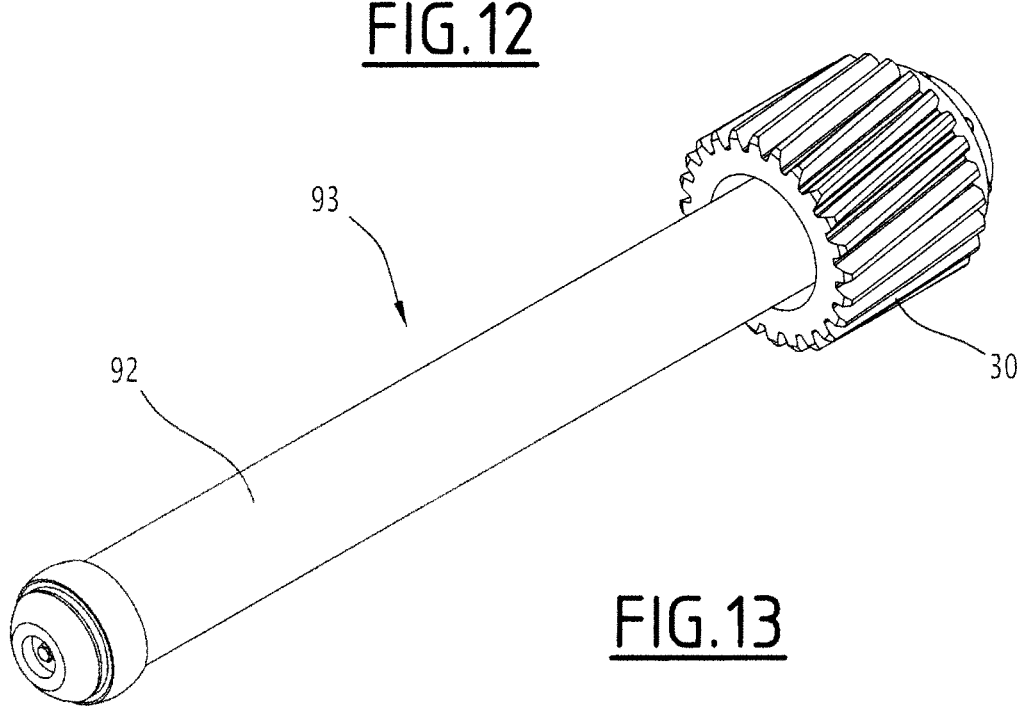
FIG. 13 shows in a perspective view the elongated module.
Figure 14:
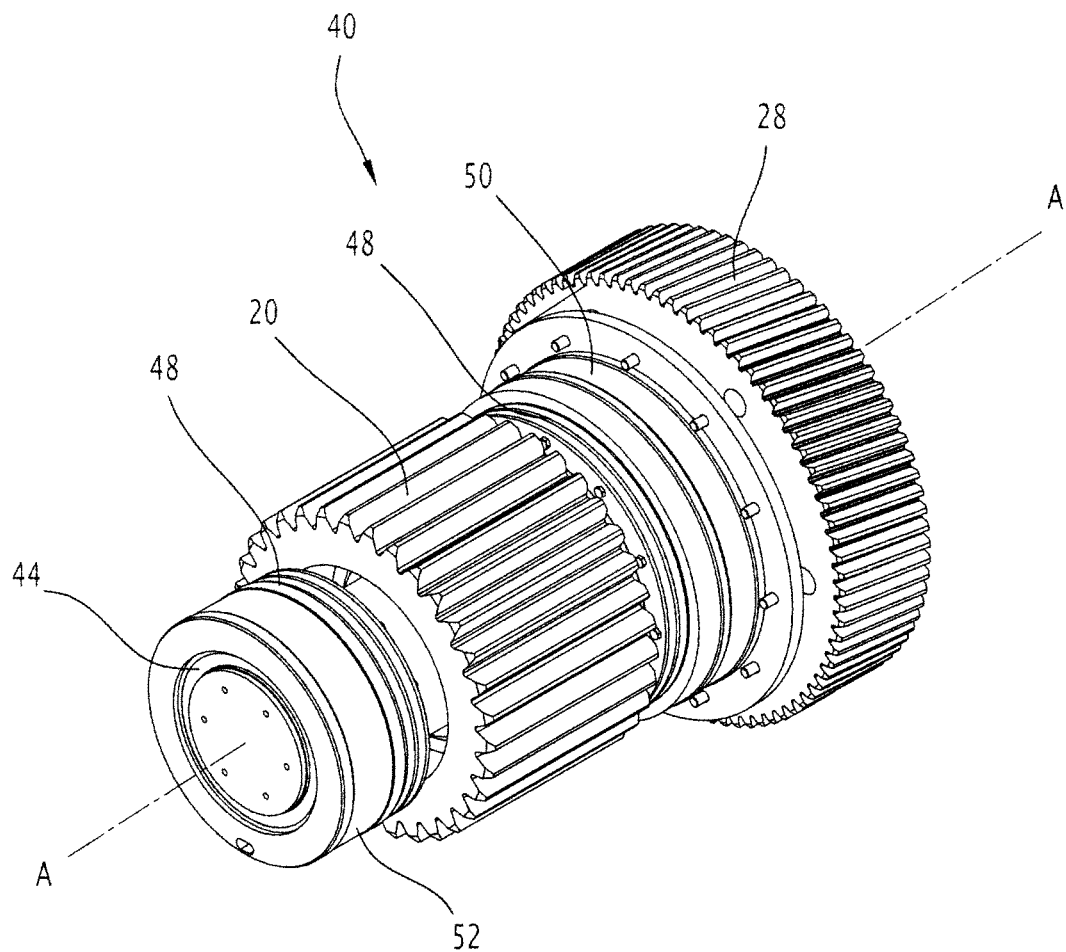
FIG. 14 shows in a perspective view the output pinion module.

Each downstream toothed wheel 28 and each downstream pinion 30 have oblique teeth, notably helicoidal teeth (c.f. FIGS. 13 and 14).

The reduction transmission 10 has for each group of two output pinions 20, therefore for each downstream reduction stage 26, an upstream reduction stage 32. Each upstream reduction stage 32 is driven by the drive shaft 18 and comprises an upstream toothed wheel 34, an upstream pinion 36 and an intermediate wheel 38. The intermediate toothed wheel 38 meshes with the upstream toothed wheel 34 on the one hand and with the upstream pinion 36 on the other hand. Also, both upstream reduction stages 32 have a single common upstream pinion 36.

With the intermediate toothed wheel 38 it is possible to increase the center line distance between the drive shaft 18 and the upstream toothed wheel 34.

Each upstream toothed wheel 34, each intermediate toothed wheel 38 and the upstream pinion 36 have oblique teeth, and notably helicoidal teeth.

The drive shaft 18 therefore drives each upstream reduction stage 32, each of which drives a downstream reduction stage 26, which drives the output pinions 20.

The reduction transmission 10 defines an axis DX direction. All the axes of rotation of the pinions and toothed wheels of the reduction transmission 10 extend parallel to this direction DX.

Each output pinion 20 defines a middle plane, extending perpendicularly to the DX axis direction. In their neutral position (c.f. below), all the middle planes of the pinions 20 are centered on an output pinion plane P1, perpendicularly to the DX axis direction. The middle planes of the downstream toothed wheels 28 and of the downstream pinions 30 are axially aligned along a plane P2. The plane P2 is parallel to the output pinion plane P1.

The upstream toothed wheels 34, the upstream pinion 36, and if necessary, the intermediate toothed wheel 38 each have a middle plane, extending perpendicularly to the DX axis direction. These middle planes are axially aligned relatively to each other and extend along an upstream reduction stage plane P3. The plane P3 is parallel to the planes P1 and P2.

The planes P2 and P3 are located on two opposite sides of the plane P1. In other words, considered along the DX axis direction, the output pinions 20 are positioned between the downstream reduction stage 26 and the upstream reduction stage 32.

Figure 4:
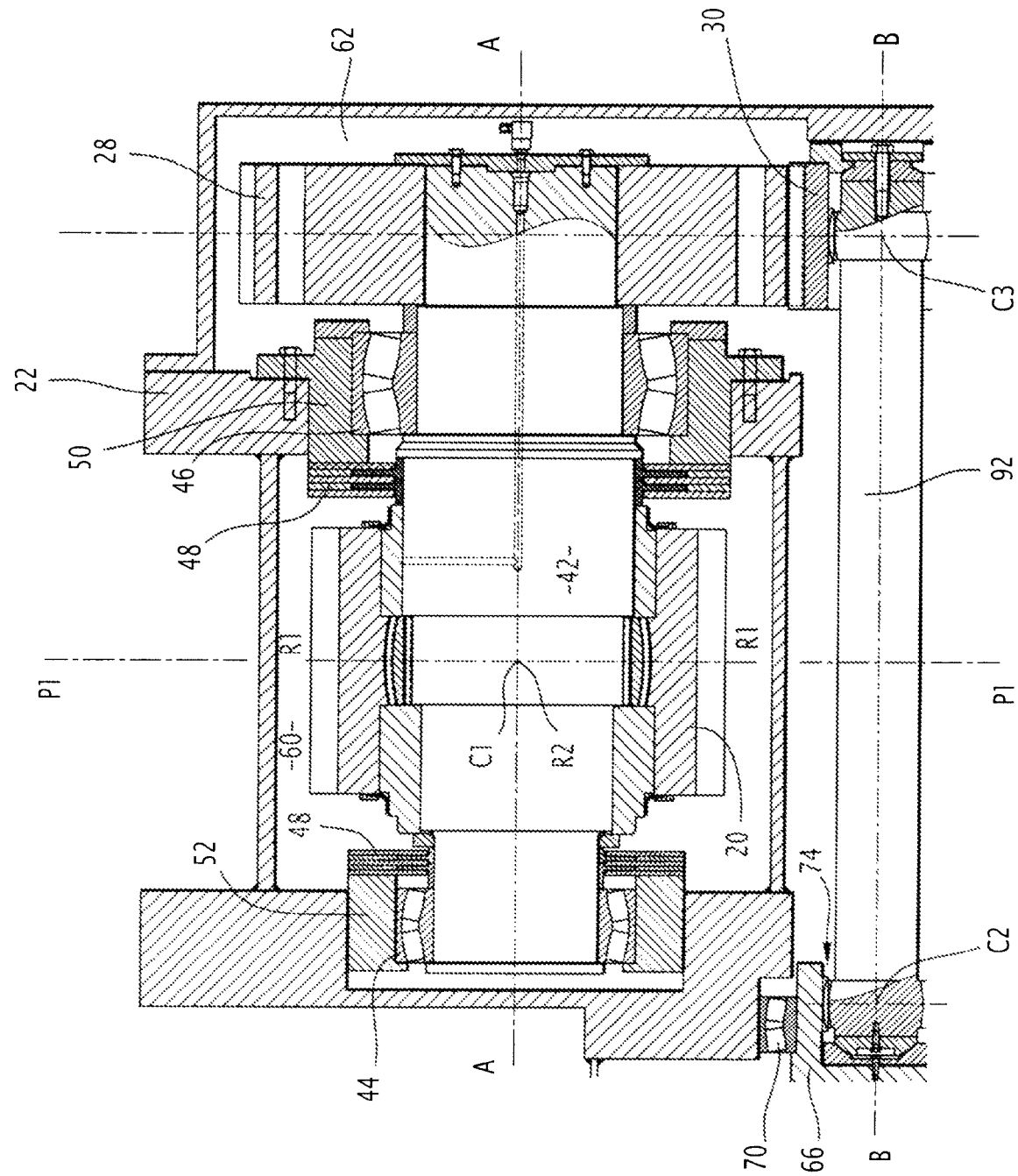
FIG. 4 is a view at a larger scale of the detail IV of FIG. 3.

The portion of the reduction transmission including the output pinion 20 and the downstream toothed wheel 28 is illustrated in more detail in FIG. 4.

The reduction transmission 10 comprises for each output pinion 20 an output pinion module 40. This output pinion module 40 comprises one of the output pinions 20 as well as an associated downstream toothed wheel 28. The output pinion module 40 also includes an output shaft 42 and two roller bearings 44, 46 which support the shaft 42 relatively to the casing 22. The output pinion module 40 is further provided with two seal gaskets 48 (cf. FIG. 14).

Further, the output pinion module 40 includes a first supporting block 50 bearing the outer track of the roller bearing 46 and an outer portion of one of the seal gaskets 48.

A second supporting block 52 of the output pinion module bears the outer track of the bearing 44 and an outer portion of the other seal gasket 48.

The output pinion 20 is positioned on the output shaft 42 axially between both of the roller bearings 44, 46 while the downstream toothed wheel 28 is positioned on the output shaft 42 on the side of the roller bearing 46 opposite to the output pinion 20.

The output pinion 20 is fixedly mounted in rotation on the output shaft 42 by any suitable means, such as splines, hooping, and/or wedged keying.

In the present case, the output pinion 20 is mounted on the output shaft 42 fixed in rotation around the axis of rotation A-A, but having one degree of rotational freedom around a ball joint center C1 defined by two axes R1, R2 perpendicular to each other and perpendicular to the A-A axis (see FIG. 4). The rotational freedom around this ball joint center C1 is greater than 0.04° and at most 0.4° relatively to a neutral position in which the central axis of the output pinion is aligned with the axis A-A. Thus, the relative angular position between the output shaft 42 and the output pinion 20 is adapted depending on the contact point between the output pinion 20 and the crown gear 6.

As this is also visible in FIG. 4, the casing 22 delimits a pinion space 60, in which are found the output pinions 20, and a downstream space 62 accommodating at least the downstream reduction stage 26. Both of these spaces 60, 62 are sealably separated from each other by means of a seal gasket 48. The pinion space 60 includes a first lubricant for example grease. The downstream space 62 includes a second lubricant, for example oil, thus the different components of the reduction transmission of the output pinions 20 may be lubricated by a lubricant different from that of the output pinions.

The downstream space 62 advantageously also comprises the other toothed wheels 28, 38 and pinions 30 of the reduction transmission 10.

Figure 12:
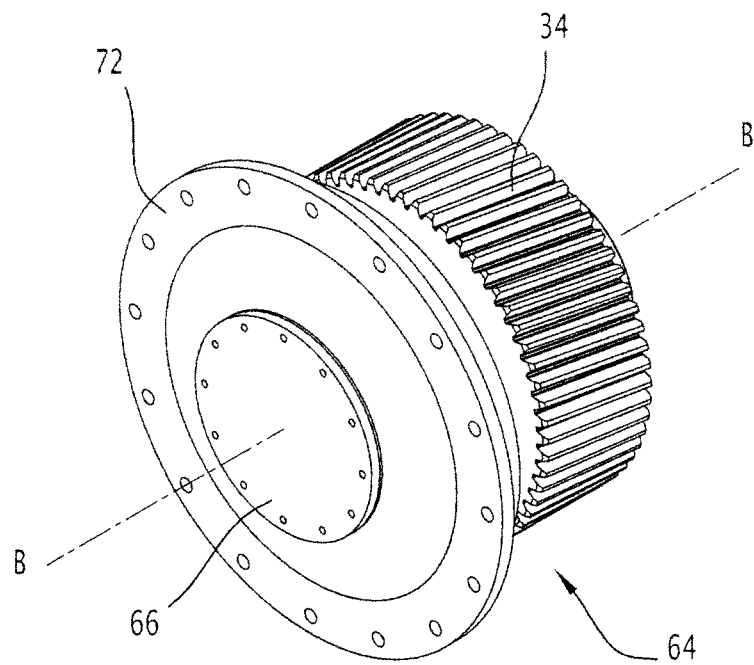
FIG. 12 shows in a perspective view the upstream wheel module.

The reduction transmission 10, in the present case, the upstream reduction stage 32, includes an upstream wheel module 64 (cf. FIG. 12). This upstream wheel module 64 comprises the upstream toothed wheel 34, an upstream shaft 66. bearing the upstream toothed wheel 34, and two roller bearings 68, 70 supporting the upstream shaft 66. The upstream shaft defines an axis of rotation B-B of the upstream toothed wheel. The upstream wheel module 64 also includes a supporting block 72 with which the roller bearing 68 is attached to the casing 21. The upstream toothed wheel 34 is axially positioned between both roller bearings 68, 70. The upstream shaft 66 includes, on the axial side directed towards the upstream reduction stage 26, a receiving space 74 (cf. FIG. 5) which will be described later on.

Figure 11:
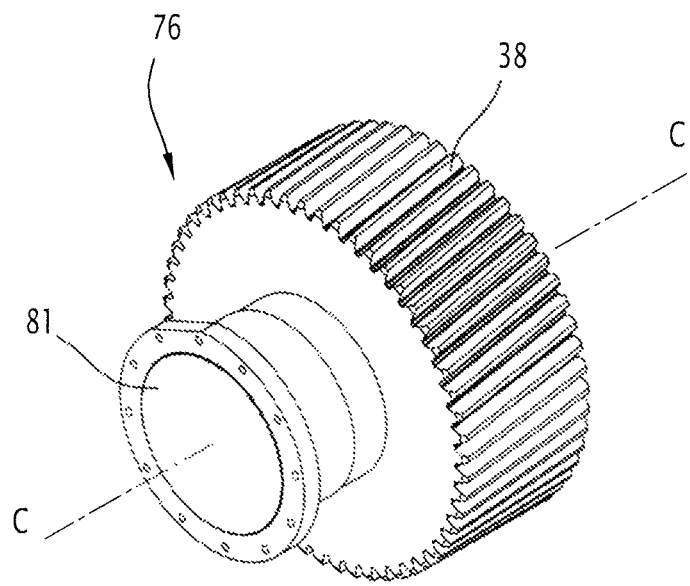
FIG. 11 shows in a perspective view the intermediate toothed wheel and the intermediate shaft.

The reduction transmission 10 has an intermediate module 76 (see FIGS. 3 and 11). The intermediate module 76 consists of the intermediate toothed wheel 38 and of a bearing 78. Alternatively, instead of the bearing 78, two roller bearings are positioned inside the toothed wheel 38. The reduction transmission 10 also comprises an intermediate shaft 81 attached to the casing and supporting the intermediate module 76. The intermediate wheel 38 is accommodated in rotation around an axis of rotation C-C defined by the intermediate shaft 81.

Figure 10:
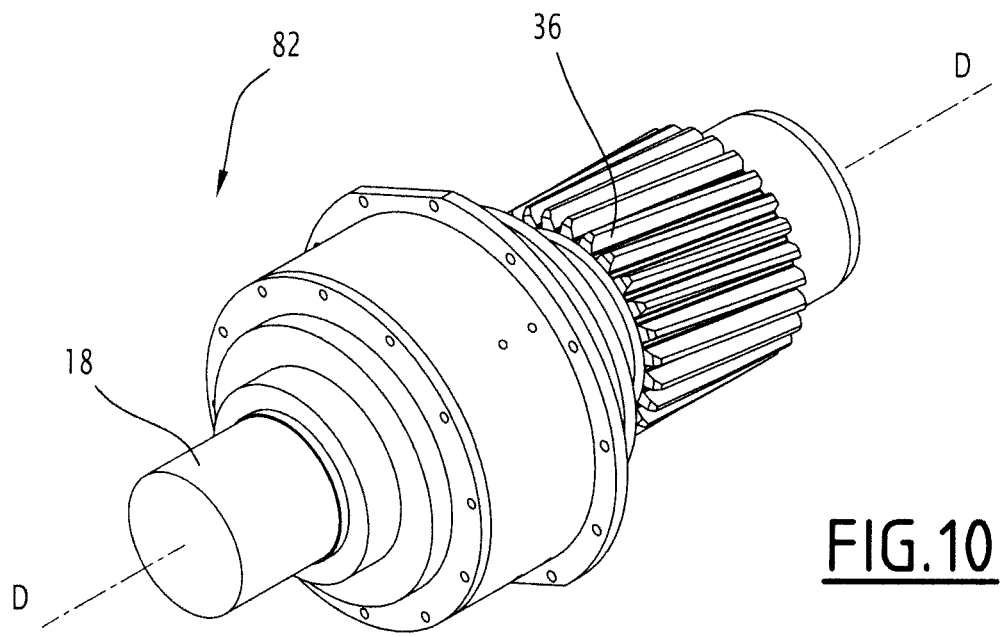
FIG. 10 shows in a perspective view the drive module.

The reduction transmission 10 is further provided with a drive module 82 (cf. FIG. 10) which includes the drive shaft 18, the upstream pinion 36 and bearings 84, 86. The drive shaft 18 defines an axis of rotation D-D of the upstream pinion 36.

The drive shaft 18 is mounted in the bearings 84, 86 so as to be translationally mobile radially relatively to the axis of rotation D-D. Thus the upstream pinion 36 has freedom of translation along radial directions relatively to the axis of rotation D-D. Thus, the upstream pinion 36 also has freedom of translation radially relatively to the axis of rotation C-C of the intermediate toothed wheels 38 with which this upstream pinion 36 meshes. The freedom of displacement is sufficient so as to allow leveling of the meshing forces acting between one of the two intermediate toothed wheels 38 and the upstream pinion 36 on the one hand and between the other one of the two intermediate toothed wheels 38 and the upstream pinion 36 on the other hand.

Also, the reduction transmission 10 includes an abutment 87 axially attaching the drive shaft 18 relatively to the casing 22. This abutment 87 has translational freedom along a plane perpendicular to the axis D-D in order to give the upstream pinion 36 its aforementioned translational freedom.

Preferably, the upstream pinion 36 and the drive shah are made in one single piece.

Figure 5:
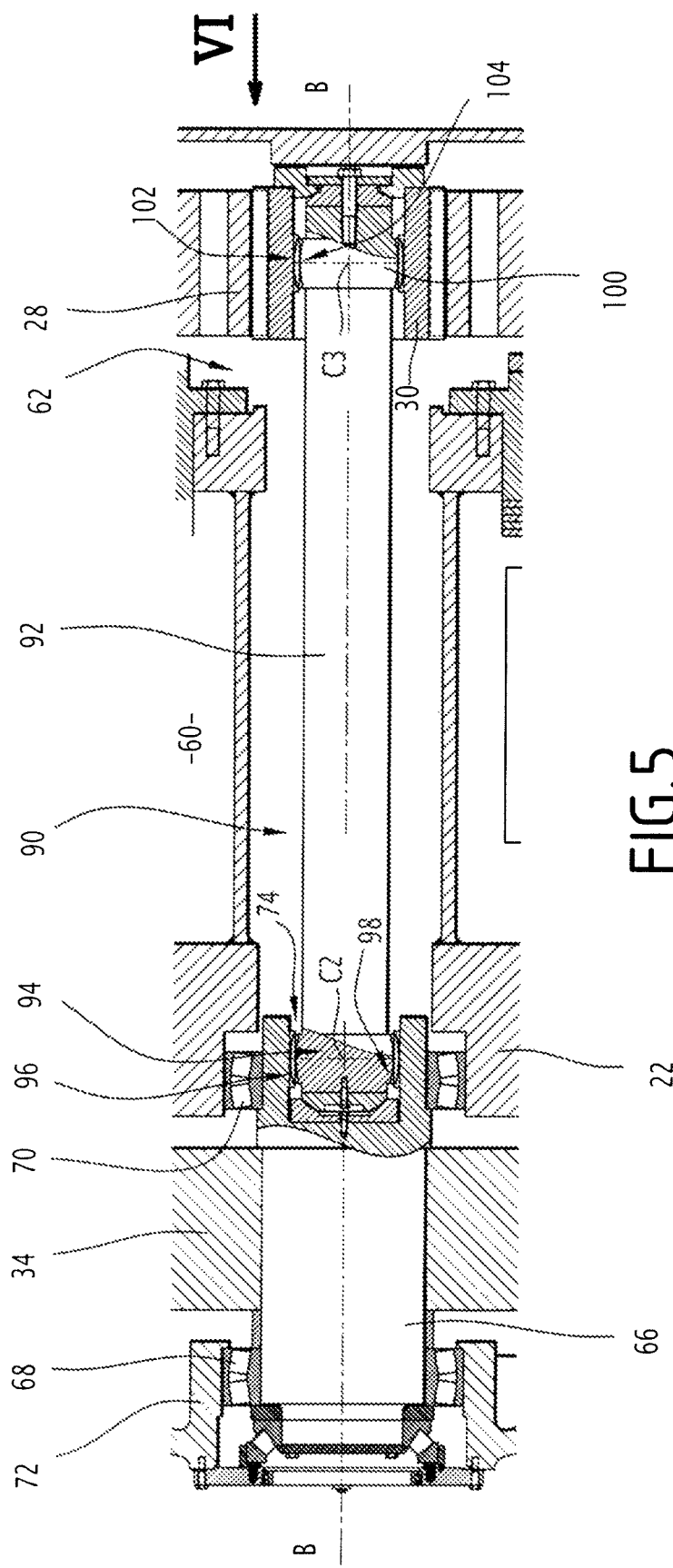
FIG. 5 is a view at a larger scale of the detail V of FIG. 3.

The link 90 between the upstream reduction stave 32 and the downstream reduction stage 26 is illustrated in more detail in FIG. 5.

This link 90 is adapted so as to transmit the rotation of the upstream shaft 66 to the downstream pinion 30. The link 90 includes an elongated shaft 92 which is attached in rotation to the shaft 66 of the upstream reduction stage 32 on the one hand and attached in rotation to the downstream pinion 30 on the other hand.

Moreover, the upstream shaft 66 and the elongated shaft 92 define a ball joint center C2. The elongated shaft 92 may be angularly shifted from the axis B-B around this center C2. Thus, the elongated shaft 92 and the downstream pinion 30 define a ball joint center C3. The downstream pinion 30 may be angularly shifted relatively to the central axis of the elongated shaft 92 around this ball joint center C3. The ball joint centers C2, C3 are formed with the following features.

The elongated shaft 92 includes an axial end 94 having a convex spherical span 96.

The space 74 for receiving the upstream shaft 66 includes a hollow spherical span 98. Both of these spherical spans 96, 98 cooperate and define the ball joint center C2 of the elongated shaft 92 relatively to the shaft 66 and this along axes perpendicular to the axis of rotation B-B and perpendicular to each other. The elongated shaft 92 includes an end 100 having a convex spherical span 102 cooperating with a concave spherical span 104 made in the downstream pinion 30, and defining the ball joint center C3 of the downstream pinion 30 around the elongated shaft 92.

Moreover, the downstream pinion 30 is axially attached on the elongated shaft 92. Thus the downstream pinion 30 and the elongated shaft 92 are part of an elongated module 93 (FIG. 13).

Figure 6:
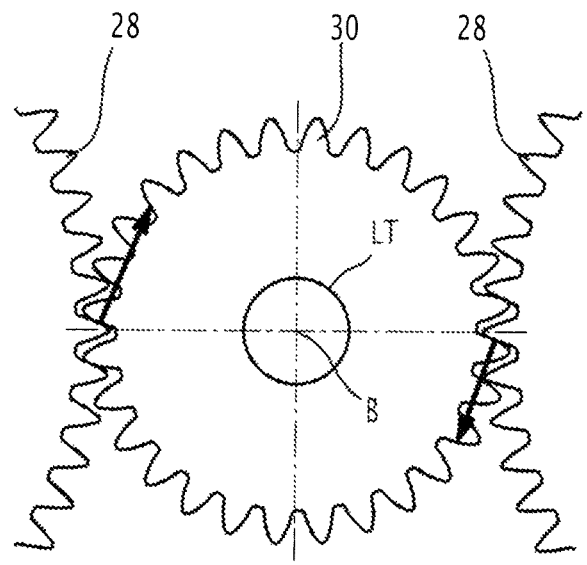
FIG. 6 is a schematic view of the downstream pinion and of the downstream toothed wheels taken along the arrow VI of FIG. 5.

The downstream toothed wheels 28 and the downstream pinion 30 are schematically shown in an axial view in FIG. 6. As this is visible, by means of the angular shift freedom around ball joint centers C2, C3, the downstream pinion 30 has translational freedom along radial directions relatively to the axis of rotation B-B. Thus the downstream pinion 30 also has translational freedom radially relatively to the axes of rotation A-A of the downstream toothed wheels 28 with which this downstream pinion 30 meshes. The displacement freedom is sufficient for allowing leveling of the meshing forces acting between one of the two downstream toothed wheels 28 and the associated downstream pinion 30 on the one hand and between the other one of the two downstream toothed wheels 28 and this downstream pinion 30. The translational freedom is indicated by a circle LT inside which all the possible positions of the central axis of the downstream pinion 30 are located. The downstream pinion 30 thus adapts its radial position automatically depending on the reaction forces generated by the downstream toothed wheels 28.

Figure 7:
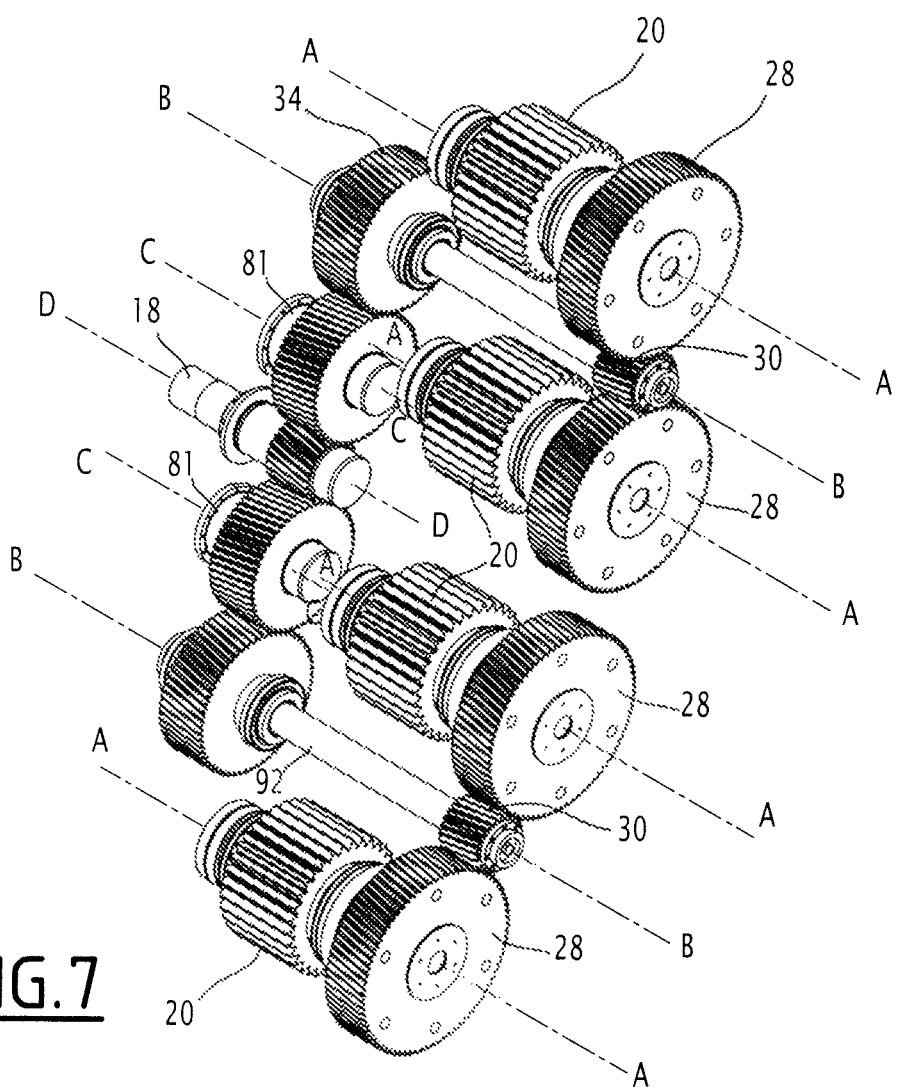
FIG. 7 is a perspective view of the reduction transmission in the assembled condition, the casing 22 being omitted.
Figure 8:
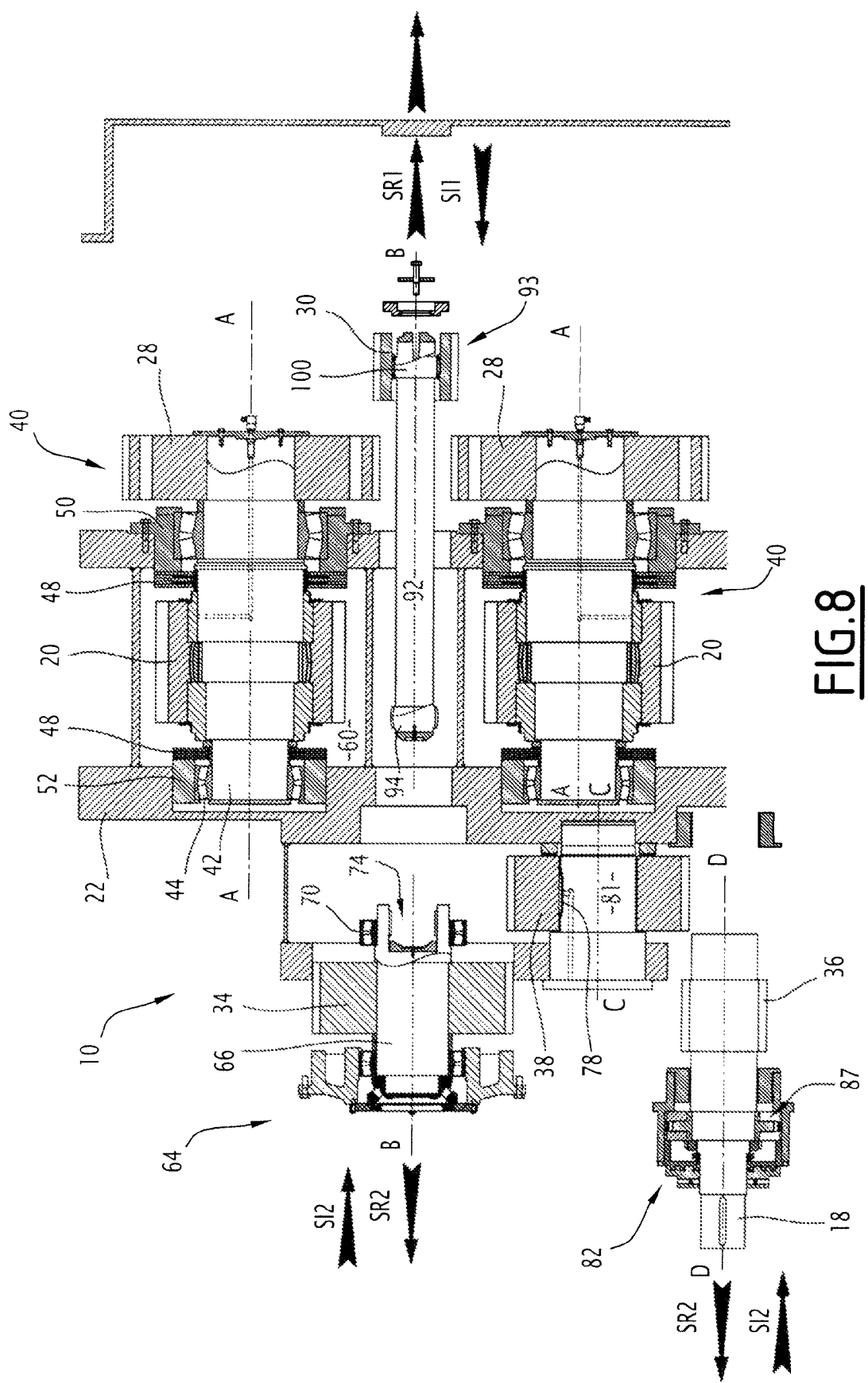
FIG. 8 is a sectional view of a portion of the reduction transmission during the withdrawal of the upstream wheel module, the withdrawal of the drive module and the withdrawal of the elongated module.
Figure 9:
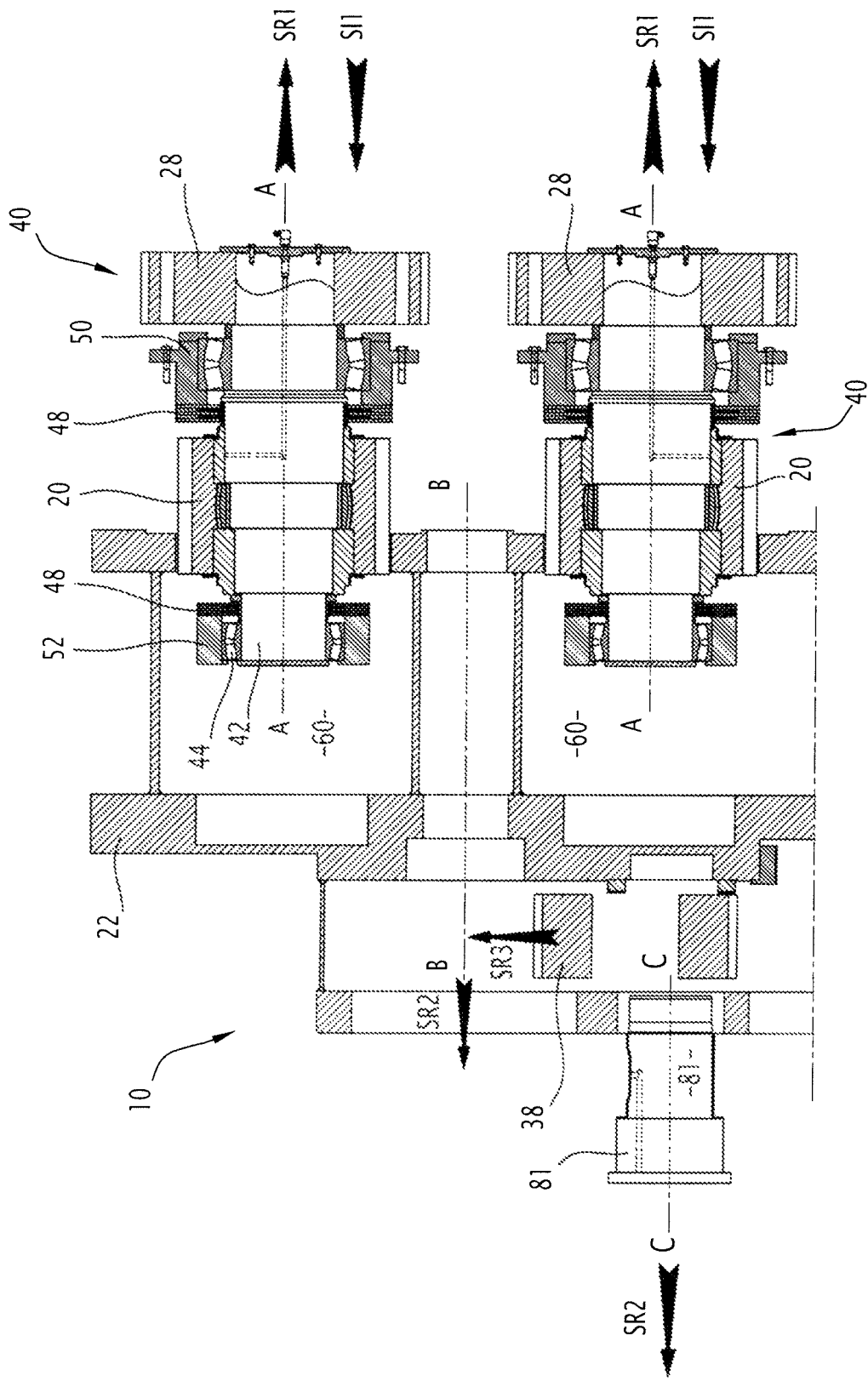
FIG. 9 is an identical view with that of FIG. 8, during the withdrawal of the output pinion module and during the withdrawal of an intermediate toothed wheel.

FIG. 7 shows in a perspective view the reduction transmission 10, the casing 22 having been omitted. FIGS. 8 and 9 show the assembling and disassembling of the different components of the reduction transmission 10.

FIG. 8 illustrates as a sectional view, approximately the upper half of FIG. 3.

With reference to FIG. 8, it is seen that the upstream wheel module 64 may be withdrawn from the casing 22 as a single block along a withdrawal direction SR2. Also, the upstream wheel module 64 may be inserted into the casing as a single block along an insertion direction S12.

Also, the elongated module 93, comprising the downstream pinion 30 and the elongated shaft 92, may be withdrawn from the casing 22 as a single block, and this along a withdrawal direction SR1.

The elongated module 93 may be inserted into the casing 22 along an insertion direction S11.

FIG. 9 shows the output pinion module 40 during its disassembling. It is seen that the output pinion module 40 may be withdrawn as a single block from the casing 22, along a withdrawal direction SRI. Also, the output pinion module 40 may be inserted into the casing 22 as a single block along an insertion direction S11.

In FIG. 8, it is seen that the drive module 82 may be withdrawn from the casing as a single block along the withdrawal direction SR2.

FIG. 9 also shows the disassembling of the intermediate module 76. For this purpose, the intermediate shaft 81 is axially withdrawn from the casing 22 along the direction SR2. Next, the intermediate module 76 is shifted in the casing along a withdrawal direction SR3 directed radially relatively to the axis of rotation C-C until the intermediate module 76 is found facing the aperture for receiving the upstream wheel module 64. Next, the intermediate module 76 is withdrawn from the casing 22 along the withdrawal direction SR2. The assembling of the intermediate module 76 is carried out in the opposite order.

The intermediate module 76 may therefore be withdrawn from the casing exclusively after withdrawal of the upstream wheel module 64 but independently of the drive module 82 and even when the latter is in the assembled condition in the casing.

The withdrawal directions SR1 and SR2 are directed opposite to each other. Also, the insertion directions SI1 and SI2 are directed opposite to each other.

The drive device 8 according to the invention is particularly advantageous given the fact that a single driving motor 12 drives a large number of output pinions, in the given example, four output pinions, which allows distribution of the driving power of a single motor and maintaining small reaction forces between the output pinions 20 and the crown gear 6.

Moreover, the modular construction allows the reduction transmission to be completely disassembled while maintaining the casing 22 in place.

Also, each of the modules 82, 64, 40, 93 may be withdrawn or inserted independently of all the other modules, which facilitates maintenance of the reduction transmission.

The assembling of the intermediate module 76 through the aperture of the casing 22 which receives the upstream wheel module 64 keeps the number of apertures in the casing 22 small.

Moreover, the arrangement of the upstream reduction stages 32 and the downstream reduction stages 26 on both opposite sides of the output pinions 20 leads to low congestion of the reduction transmission.

According to other features of the invention,
one or each output pinion may be withdrawn from the casing 22 along a withdrawal direction which extends along the axis of the output pinion;
the withdrawal direction of the output pinion is parallel to the axis of rotation of the grinding chamber 4 over the whole path between a position in which the output pinion is entirely outside the casing and a mounted position.

The invention claimed is:

1. A horizontal grinder, comprising a grinding chamber, a crown gear attached to the grinding chamber and a device for driving the crown gear, characterized in that the drive device is a drive device for the crown gear, of the type comprising a reduction transmission which is provided:
with a drive shaft adapted so as to be connected to a motor,
at least one output pinion, said or each output pinion being adapted so as to mesh with the crown gear and be driven by the drive shaft, and;
with a casing,
and in that the reduction transmission comprises at least two output pinions;
wherein the reduction transmission forms at least one group of pinions, each group consisting of two output pinions,
wherein the reduction transmission comprises at least one downstream reduction stage and each group of pinions is driven by a downstream reduction stage;
wherein at least one or each downstream reduction stage comprises:
a downstream toothed wheel per output pinion of the group of pinions, and
a single downstream pinion meshing with each downstream toothed wheel of the downstream reduction stage; and
wherein the downstream pinion is mounted with radial mobility relatively to the axes of rotation of the downstream toothed wheels;
wherein the reduction transmission comprises at least one upstream reduction stage driven by the drive shaft, the upstream reduction stage being adapted so as to drive a downstream reduction stage; and
wherein the upstream reduction stage and the downstream reduction stage are connected through an elongated shaft and the downstream pinion is mounted through a link having two ball joint centers to the upstream reduction stage.

2. The grinder according to claim 1, wherein the reduction transmission comprises an output pinion module, this output pinion module comprising,
an output pinion,
an output shaft bearing the output pinion
two roller bearings supporting the output shaft,
and wherein the output pinion module may be withdrawn as a single block from the casing and/or inserted as a single block into the casing.

3. The grinder according to claim 1, wherein the reduction transmission comprises an upstream wheel module comprising:
one or said upstream toothed wheel,
an upstream shaft bearing the upstream toothed wheel,
two roller bearings supporting the upstream shaft
and wherein the upstream wheel module may be withdrawn as a single block from the casing and/or inserted as a single block into the casing.

4. The grinder according to claim 1, wherein the reduction transmission comprises a drive module comprising:
the drive shaft,
the upstream pinion,
and wherein the drive module may be withdrawn as a single block from the casing and/or inserted as a single block into the casing.

5. The grinder according to claim 1, wherein at each time the insertion direction (SI1) of the output pinion module into the casing and the insertion direction (SI2) of the upstream wheel module and the withdrawal direction (SR1) of the output pinion module from the casing and the withdrawal direction (SR2) of the upstream wheel module from the casing are directed opposite to each other.

6. The grinder according to claim 1, wherein the reduction transmission comprises an intermediate module comprising an intermediate toothed wheel and the intermediate module may be withdrawn from the casing along a withdrawal direction (SR3) perpendicular to the axis of rotation C-C of the intermediate wheel, and in particular the intermediate module being able to be withdrawn from the casing through an aperture adapted for accommodating the upstream wheel module.

7. The grinder according to claim 1, wherein the output pinions are arranged on a pitch circle, and the axes of rotation (A-A) of all the output pinions are positioned inside an angular range of less than 180°, and notably less than 90°, of this pitch circle.

8. The grinder according to claim 1, further comprising a driving motor notably a single driving motor, the driving motor comprising a motor shaft and the motor shaft being attached in rotation to the drive shaft.

9. The grinder according to claim 1, wherein the casing delimits a pinion space which accommodates at least one output pinion, and a downstream space which accommodates at least the downstream reduction stage, wherein the reduction transmission comprises sealing means separating the pinion space and at least the downstream space.

10. The grinder according to claim 1, wherein said or each upstream reduction stage comprises:
an upstream toothed wheel for each group of pinions, and
an upstream pinion notably a single upstream pinion, adapted for driving each upstream toothed wheel and being interdependent in rotation relatively to the drive shaft.

11. The grinder according to claim 1, wherein said or each upstream reduction stage comprises, for each group of pinions, an intermediate toothed wheel, each intermediate toothed wheel meshing with an upstream toothed wheel and the upstream pinion.

12. The grinder according to claim 1, wherein each output pinion is adapted so as to apply a meshing force to the crown gear and wherein the resulting force FR of all these meshing forces has a component directed vertically upwards.

13. The grinder according to claim 1 wherein the reduction transmission comprises at least three output pinions.

14. The grinder according to claim 1 wherein the reduction transmission comprises at least four output pinions.

15. The grinder according to claim 1, wherein the two output pinions are adjacent output pinions.

16. The grinder according to claim 1, wherein the output pinion module comprises an output shaft bearing the output pinion and a downstream toothed wheel.

* * * * *